(12) United States Patent
Komaki et al.

(10) Patent No.: US 7,502,309 B2
(45) Date of Patent: Mar. 10, 2009

(54) OPTICAL RECORDING MEDIUM HAVING A RELATIONSHIP BETWEEN CONVEX WIDTH AND TRACK PITCH

(75) Inventors: Tsuyoshi Komaki, Tokyo (JP); Kenji Yamaga, Tokyo (JP)

(73) Assignee: TDK Corporation, Tokyo (JP)

( * ) Notice: Subject to any disclaimer, the term of this patent is extended or adjusted under 35 U.S.C. 154(b) by 567 days.

(21) Appl. No.: 10/976,820

(22) Filed: Nov. 1, 2004

(65) Prior Publication Data

US 2005/0095771 A1  May 5, 2005

(30) Foreign Application Priority Data

Nov. 5, 2003  (JP) .............. 2003-375598

(51) Int. Cl.
  *G11B 7/24*  (2006.01)
(52) U.S. Cl. .............................. 369/275.4; 369/275.1
(58) Field of Classification Search .... 369/275.1–275.5
  See application file for complete search history.

(56) References Cited

U.S. PATENT DOCUMENTS

| | | | | |
|---|---|---|---|---|
| 5,817,389 | A * | 10/1998 | Ono | ......................... 369/283 |
| 6,033,752 | A * | 3/2000 | Suzuki et al. | ............... 428/64.1 |
| 6,221,455 | B1 * | 4/2001 | Yasuda et al. | ............... 369/283 |
| 6,724,716 | B2 * | 4/2004 | Yamaguchi et al. | ...... 369/275.2 |
| 6,908,725 | B2 * | 6/2005 | Blankenbeckler et al. | ...................... 369/275.1 |
| 7,129,019 | B2 * | 10/2006 | Kakuta et al. | ............... 369/288 |
| 2005/0053728 | A1 * | 3/2005 | Komaki | ...................... 427/553 |
| 2005/0053752 | A1 * | 3/2005 | Komaki | ..................... 428/64.4 |
| 2005/0093185 | A1 * | 5/2005 | Komaki | ..................... 264/1.33 |
| 2006/0067202 | A1 * | 3/2006 | Yashiro | ................... 369/275.1 |
| 2006/0098561 | A1 * | 5/2006 | Iwasa et al. | ............. 369/275.1 |

FOREIGN PATENT DOCUMENTS

| | | |
|---|---|---|
| JP | A 2002-342992 | 11/2002 |
| JP | A 2002-342993 | 11/2002 |
| JP | A 2003-085836 | 3/2003 |
| JP | A 2003-091887 | 3/2003 |

* cited by examiner

*Primary Examiner*—Tan X Dinh
(74) *Attorney, Agent, or Firm*—Oliff & Berridge, PLC

(57) ABSTRACT

An optical recording medium and a method for manufacturing the same, which offer to an information layer formed on a spacer layer the same electric characteristics such as a jitter and a noise as those of an information layer formed on a substrate, are provided. A convexo-concave pattern is transferred to a face of a spacer layer, which is opposite to the side of a substrate, so that a radial width of a convex portion is limited to be 53% or larger and 72% or smaller with respect to a radial pitch of concavity and convexity. A second information layer (information layer on the spacer layer) is formed in accordance with the convexo-concave pattern.

4 Claims, 10 Drawing Sheets

OPTICAL RECORDING MEDIUM HAVING A RELATIONSHIP BETWEEN CONVEX WIDTH AND TRACK PITCH

BACKGROUND OF THE INVENTION

1. Field of the Invention

The present invention relates to an optical recording medium including an information layer formed on a substrate, a spacer layer formed on the information layer, and another information layer formed on the spacer layer. The invention also relates to a method for manufacturing the same.

2. Description of the Related Art

Recently, optical recording media such as a CD (Compact Disc) and a DVD (Digital Versatile Disc) are rapidly spreading as information recording media. The optical recording medium is generally standardized to have an outer diameter of 120 mm and a thickness of 1.2 mm. In the case of the DVD, a laser beam having a shorter wavelength than that for the CD is used as irradiation light. In addition, a numerical aperture of a lens of the DVD for the irradiation light is set larger than that for the CD. As a result, the DVD is capable of recording and reproducing a larger amount of information at a higher density than the CD.

On the other hand, information recording and reproduction accuracy is more likely to lower as the wavelength of irradiation light becomes shorter and the numerical aperture of a lens becomes larger. This is because coma aberration occurs due to inclination and warp of a disc. Thus, the DVD includes a light transmitting layer having a half thickness of that of the CD, that is, 0.6 mm so as to ensure a margin for the inclination and the warp of the disc to maintain the information recording/reproduction accuracy.

Since the light transmitting layer at a thickness of 0.6 mm alone does not offer sufficient stiffness and strength, the DVD has such a structure that a pair of substrates, each having a thickness of 0.6 mm, are bonded to each other so that the information recording faces inside. As a result, the DVD has a thickness of 1.2 mm, which is equal to that of the CD, to ensure almost the same stiffness and strength as those of the CD.

In order to realize the recording of a larger amount of information at a higher density, the wavelength of irradiation light is further reduced while the numerical aperture of a lens is further increased. In response thereto, an optical recording medium including a light transmitting layer at a further reduced thickness has attracted attention (for example, see Japanese Patent Laid-Open Publication No. 2003-85836).

In order to standardize the specifications, a blue-violet laser beam having a wavelength of approximately 405 nm is used as irradiation light while the numerical aperture is set to 0.85. In correspondence with the laser beam and the numerical aperture, an optical recording medium including a light transmitting layer at a thickness of approximately 100 μm is now increasingly in widespread use. It is proposed that a track pitch of a convexo-concave pattern of pits or grooves (pitch of concave and convex portions in radial direction) of an information layer is set to approximately 320 nm.

The optical recording medium can also be formed as a dual-layer recording medium by forming a spacer layer on an information layer formed on either one of or both the surfaces of a substrate having a convexo-concave pattern such as a pit and a groove and then forming another information layer on the spacer layer. In order to standardize the specifications for the dual-layer recording medium, it is suggested to set a thickness of the spacer layer to approximately 25 μm and a thickness of the light transmitting layer to approximately 75 μm (total thickness of approximately 100 μm). Incidentally, the dual-layer recording medium may have two or more spacer layers to form three or more information layers.

As a technique of forming a plurality of information layers, each being in a convexo-concave patterned shape composed of pits and grooves, the following technique is known (for example, see Japanese Patent Laid-Open Publication No. 2003-91887). According to the technique, a convexo-concave pattern is first formed on a substrate by injection molding. An information layer is formed by sputtering or the like in accordance with the convexo-concave pattern. Next, an energy beam curable resin in a flowing state is applied onto the information layer and a light transmitting stamper is abutted on the energy beam curable resin to transfer the convexo-concave pattern thereto. After an energy beam such as an ultraviolet ray or an electron beam is radiated onto the energy beam curable resin through the light transmitting stamper to cure the energy beam curable resin, the light transmitting stamper is removed to form a spacer layer. Another information layer is formed by sputtering or the like in accordance with a convexo-concave pattern of the spacer layer.

If an information layer in a convexo-concave patterned shape having a track pitch (a radial pitch between convex and concave portions) of 320 nm is formed by the above-mentioned technique, however, electric characteristics such as a jitter or a noise of the information layer formed on the spacer layer are likely to be inferior to those of the information layer formed on the substrate. As a result, there is a problem that desired electric characteristics cannot be obtained for the information layer formed on the spacer layer.

SUMMARY OF THE INVENTION

In view of the foregoing problems, various exemplary embodiments of this invention provide an optical recording medium which provides excellent electric characteristics for an information layer formed on a spacer layer, the electric characteristics being similar to those of an information layer formed on a substrate, and a method for fabricating the same.

The various exemplary embodiments of the present invention are intended to achieve the above object by limiting a radial width of a convex portion of a convexo-concave pattern of an information layer formed on a spacer layer to be within a predetermined range with respect to a radial pitch of concavity and convexity.

As a result of trial and error of forming various convexo-concave patterns on a spacer layer to improve electric characteristics such as a jitter and a noise of an information layer formed on the spacer layer, the inventors found that electric characteristics of the information layer formed in accordance with a convexo-concave pattern formed on a face of the spacer layer, the face being opposite to the substrate side, were more likely to be improved as a radial width of a convex portion of the convexo-concave pattern increased. Although the reason for such a tendency is not exactly known, it is generally believed as follows.

When the spacer layer is formed, an energy beam curable resin in a flowing state gets into concave portions of the convexo-concave patterns of the substrate and a light transmitting stamper, so that the convexo-concave patterns are transferred to the spacer layer. However, it is difficult for the energy beam curable resin to perfectly get into the corners of the concave portions of the substrate and the light transmitting stamper because of its viscosity. As a result, the periphery of each of the convex portions of the convexo-concave patterns on the spacer layer is likely to be slightly rounded. If a width of the convex portion is small, a proportion of a flat part at the tip of the convex portion to the width of the convex portion becomes small, resulting in a relatively large difference between a desired shape of the convex portion and an actual shape of the convex portion. On the other hand, if the width of the convex portion is large, the proportion of the flat part at the tip to the width of the convex portion becomes large even if the periphery of the convex portion is rounded. Specifically, a difference between the desired shape of the convex portion and the actual shape of the convex portion becomes relatively small. As a result, the shape of the information layer formed in accordance with the convex portion becomes closer to a desired shape. For the above-described reason, it is considered that the electric characteristics such as a jitter and a noise are improved.

If the width of the convex portion of the convexo-concave pattern of the spacer layer is large, the width of the convex portion of the light transmitting stamper for transferring the convexo-concave pattern is required to be reduced because a concave portion correspondingly becomes narrow. However, if the width of the convex portion of the light transmitting stamper is excessively small, other problems such as the deformation of the convexo-concave face of the light transmitting stamper and the damage to the convex portion of the light transmitting stamper when the light transmitting stamper is removed from the spacer layer may arise. Thus, it is preferred that the width of the convex portion of the concave-convex pattern of the spacer layer is limited to be equal to, or smaller than, a predetermined upper limit value.

Accordingly, various exemplary embodiments of the invention provide
    an optical recording medium comprising:
        a substrate;
        an information layer formed over the substrate;
        a spacer layer formed on the information layer; and
        the other/another information layer formed on the spacer layer, wherein:
            a convexo-concave pattern constituting at least one of a groove and a pit is formed on a face of the spacer layer, the face being opposite to the substrate side, so that a radial width of a convex portion is limited to be 53% or larger and 72% or smaller with respect to a radial pitch of concavity and convexity; and
            the information layer on the spacer layer is formed in accordance with the convexo-concave pattern. Various exemplary embodiments of the invention provide a method for manufacturing an optical recording medium, comprising the steps of:
        supplying an energy beam curable resin onto an information layer formed over a substrate;
        abutting a light transmitting stamper on the energy beam curable resin so as to transfer a convexo-concave pattern including at least one of a groove and a pit thereto;
        radiating an energy beam to the energy beam curable resin through the light transmitting stamper so as to cure the energy beam curable resin and removing the light transmitting stamper to form a spacer layer; and
        forming the other/another information layer on the spacer layer in accordance with the convexo-concave pattern, wherein:
            the convexo-concave pattern is transferred to a face of the spacer layer, the face being opposite to the substrate side, so that a radial width of a convex portion is limited to be 53% or larger and 72% or smaller with respect to a radial pitch of concavity and convexity; and
            the information layer on the spacer layer is formed in accordance with the convexo-concave pattern. The terms "pit" and "groove" are generally used for designating a concave portion for information transfer. In this specification, however, the terms "pit" and "groove" are used even for designating a convex portion for convenience as long as it serves for information transfer.

Throughout this specification, the term "energy beam" is used for generically denoting, for example, electromagnetic waves such as ultraviolet rays, and electron beams, and particle beams, which have a property of curing a specific resin in a flowing state.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
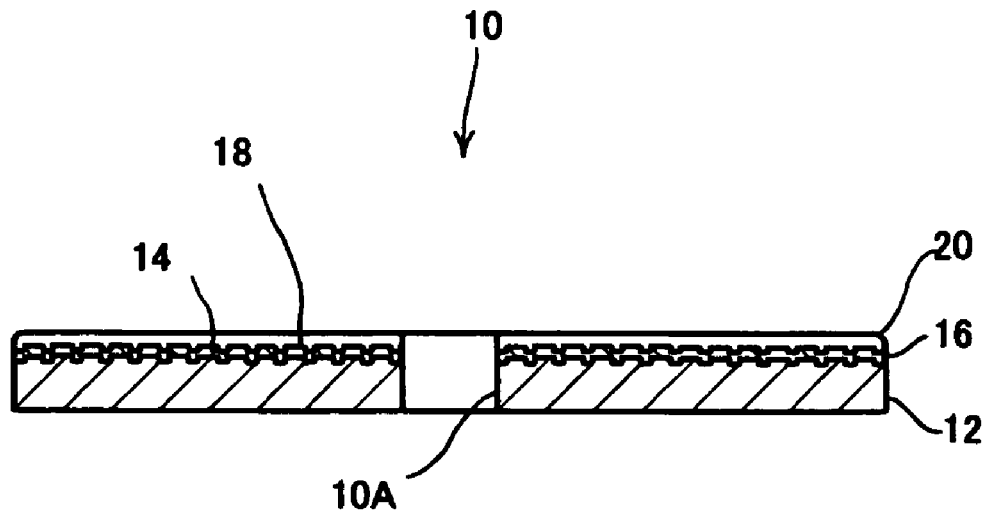
FIG. 1 is a sectional side view schematically showing a structure of an optical recording medium according to an exemplary embodiment of the present invention.

This exemplary embodiment has a characteristic in a shape of a convexo-concave pattern of a second information layer 18 in an optical recording medium 10 as shown in FIG. 1. For understanding of this exemplary embodiment, a structure of the optical recording medium 10 will first be described briefly.

An optical recording medium 10 according to this exemplary embodiment has a disc-like shape having an outer diameter of approximately 120 mm and a thickness of approximately 1.2 mm. The optical recording medium 10 is a single-sided dual-layer recording optical disc including a first information layer 14, a spacer layer 16, a second information layer 18, and a light transmitting layer 20 formed on one surface of a substrate 12 in this order. A center hole 10A having an inner diameter of approximately 15 mm is formed through the optical recording medium 10.

The substrate 12 is made of a resin such as polycarbonate, acrylic, and epoxy, and has a thickness of about 1.1 mm. A convexo-concave pattern composed of pits for information transfer or grooves for tracking servo is formed on a surface of the substrate 12 on the side of the first information layer 14.

The first information layer 14 is formed in a convexo-concave patterned shape by copying the convexo-concave pattern of the substrate 12. Since the first information layer 14 is remarkably thin as compared with the substrate 12, the spacer layer 16, and the light transmitting layer 20, it is illustrated with a line drawing. The first information layer 14 is composed of a single functional layer or a plurality of functional layers depending on its use. For example, if the optical recording medium 10 is a ROM (Read Only Memory) type, the first information layer 14 is composed of a reflective layer made of Al, Ag, Au, or the like. If the optical recording medium 10 is an RW (Re-Writable) type, the first information layer 14 is composed of a layer such as a phase-change material layer, a photomagnetic material layer, or a dielectric material layer in addition to the reflective layer. In the case of an R (Recordable) type, the first information layer 14 is composed of a layer such as a phase-change material layer or an organic dye layer in addition to the reflective layer.

The spacer layer 16 has a thickness of approximately 25 μm and is made of a material, for example, mainly composed of an energy beam curable resin having light transmittance such as an ultraviolet curable acrylic resin and an ultraviolet curable epoxy resin.

A surface of the spacer layer 16 on the first information layer 14 side has a convexo-concave pattern by copying the convexo-concave patterned shape of the first information layer 14. A convexo-concave pattern composed of pits and grooves is also formed on the other surface of the spacer layer 16 on the second information layer 18 side. Assuming a track pitch (radial pitch of concavity and convexity) corresponding to a radial distance between an end of a concave portion and an end of a convex portion adjacent thereto is 100%, a radial width of the convex portion, which projects toward the light transmitting layer 20 side, of a convexo-concave pattern of the spacer layer 16 on the side of the second information layer 18 is limited to be 53% or more and 72% or less with respect to the track pitch.

The second information layer 18 is formed in accordance with the convexo-concave pattern of the spacer layer 16, and is composed of a single functional layer or a plurality of functional layers based on its use as in the case of the first information layer 14. Since, similarly to the first information layer 14, the second information layer 18 is also remarkably thin as compared with the substrate 12, the spacer layer 16, and the light transmitting layer 20, it is illustrated with a line drawing.

The light transmitting layer 20 has a thickness of about 75 μm and is made of an energy beam curable resin having light transmittance such as an ultraviolet curable acrylic resin and an ultraviolet curable epoxy resin as in the case of the spacer layer 16. A face of the light transmitting layer 20 on the second information layer 18 side has a convexo-concave patterned shape by copying the convexo-concave pattern of the second information layer 18, whereas a surface of the light transmitting layer 20 (the other face of the light transmitting layer 20, which is opposite to the second information layer 18) is flat.

Figure 2:
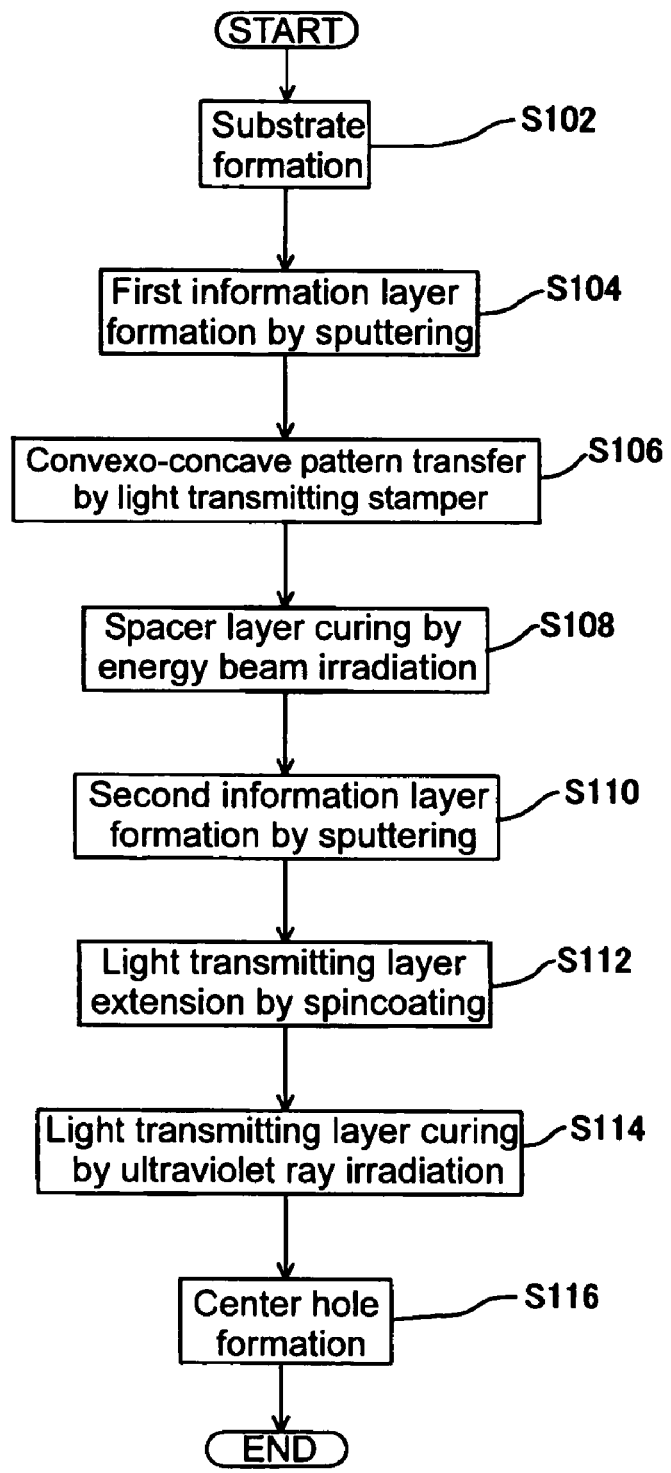
FIG. 2 is a flowchart showing the outline of a manufacturing process of the optical recording medium shown in FIG. 1.

Next, a method for fabricating the optical recording medium 10 will be described with reference to a flowchart shown in FIG. 2 and the like.

Figure 3:
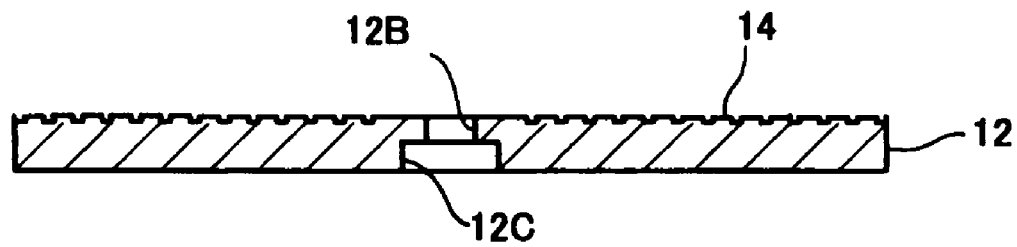
FIG. 3 is a sectional side view schematically showing a structure of a substrate in the manufacturing process of the optical recording medium.

First, the disc-shaped substrate 12 having an outer diameter of about 120 mm and a thickness of about 1.1 mm as shown in FIG. 3 is formed by injection molding (S102). At this step, a convexo-concave pattern composed of pits and grooves is formed on one face of the substrate 12. The convexo-concave pattern is formed in high accuracy by injection molding. Moreover, in the injection molding, a circular concave portion 12C having an equal inner diameter to that of the center hole 10A is formed on a face of the substrate 12, which is opposite to the face on which the convexo-concave pattern is formed. Furthermore, a manufacture hole 12B having a smaller inner diameter than that of the center hole 10A is formed through the substrate 12 in the injection molding. The manufacture hole 12B may be formed through the substrate 12 by using a tool or the like after the injection molding.

For storage, delivery, or the like, a plurality of the substrate 12 are normally piled up. Since a plurality of substrates 12 can be easily piled up in an aligned manner by simply inserting a round-bar shaped guide or the like through the manufacture holes 12B of the respective substrates 12, the storage, the delivery, and the like can be easily carried out, contributing to improvement of production efficiency.

Next, the first information layer 14 is formed on the face of the substrate 12, which carries the convexo-concave pattern, by sputtering, vapor deposition or the like (S104). The first information layer 14 is formed in a convexo-concave patterned shape by copying the convexo-concave pattern of the substrate 12. Since the convexo-concave pattern of the substrate 12 has good profile accuracy, the profile accuracy of the convexo-concave pattern of the first information layer 14 is also good.

Figure 4:
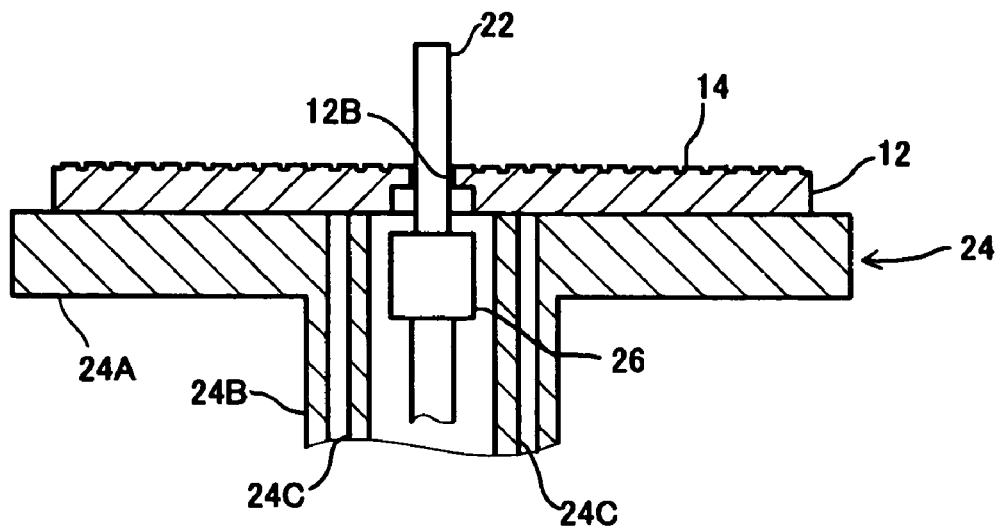
FIG. 4 is a sectional side view schematically showing a state where a core member is inserted into a manufacture center hole in the substrate.

Next, as shown in FIG. 4, while a core member 22 is being inserted into the manufacture hole 12B of the substrate 12, the substrate 12 is placed horizontally on a rotating table 24 so that the first information layer 14 is oriented upward.

The rotating table 24 has such a structure that a shaft part 24B downwardly projects beyond a disc-shaped table part 24A that is horizontally placed. In the shaft portion 24B, an air hole 24C in communication with an upper surface of the table portion 24A is formed. The shaft portion 24B is engaged with a rotation driving mechanism not shown in the drawing. A negative-pressure feeder (not shown) is connected to the air hole 24C.

The core member 22 has such a round bar shape that its outer diameter in a normal state is slightly smaller than the inner diameter of the manufacture hole 12B. Such a shape allows the core member 22 to be fitted into the manufacture hole 12B with play. The core member 22 is made of a silicone resin, a fluorocarbon resin, an acrylic resin, an olefin resin, or a mixture thereof to have elasticity. In addition, the core member 22 has a hollow structure (the illustration herein omitted). At its lower end, the interior of the core member 22 is in communication with air supply means 26. By air supply to the interior, the core member 22 is expanded to have an increased outer diameter so as to be brought into close contact with an inner circumference of the manufacture hole 12B.

Figure 5:
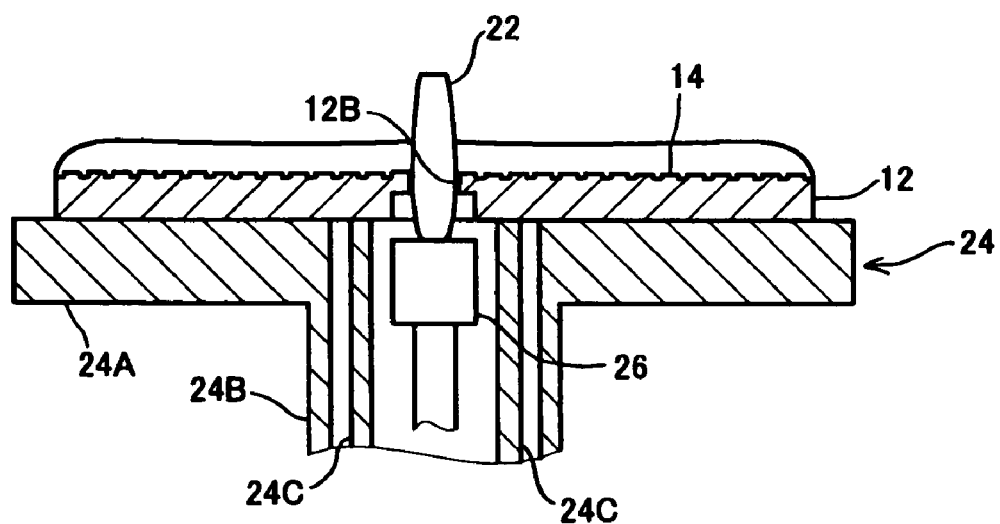
FIG. 5 is a sectional side view schematically showing a state where an energy beam curable resin is applied over the entire surface of the substrate.

First, as shown in FIG. 5, the core member 22 is expanded by the air supply means 26 so as to be brought into close contact with the inner circumference of the manufacture hole 12B. At the same time, a negative pressure is fed to the upper surface of the table part 24A so as to suck the substrate 12 to fix it onto the rotating table 24. A predetermined amount of an energy beam curable resin in a flowing state is applied over the entire surface of the substrate 12 so as to have a thickness sufficiently larger than 25 µm which corresponds to a thickness of the spacer layer 16. Since the core member 22 is in close contact with the inner circumference of the manufacture hole 12B, the energy beam curable resin does not enter the space between the core member 22 and the substrate 12.

Figure 6:
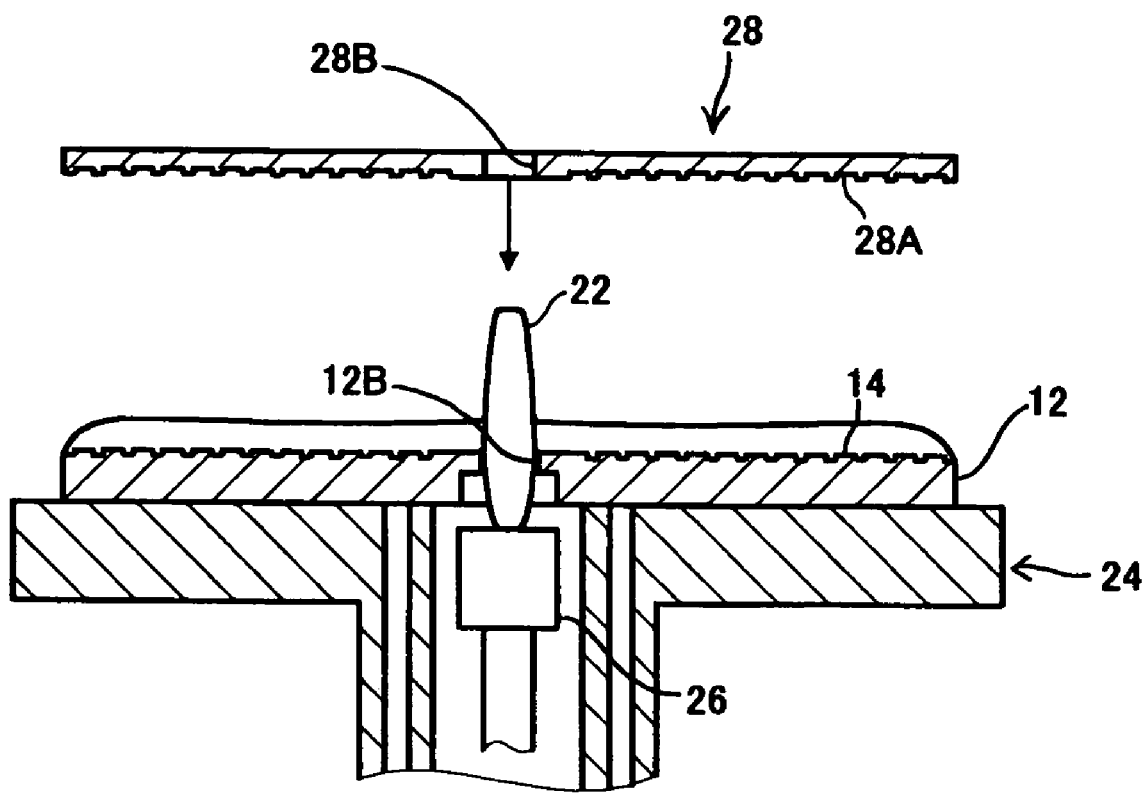
FIG. 6 is a sectional side view schematically showing a state where a light transmitting stamper is brought close to the substrate.

Next, as shown in FIG. 6, the light transmitting stamper 28 is brought close to the substrate 12. The light transmitting stamper 28, which has an approximately disc-like shape, is made of a light-transmitting material such as acrylic or glass. One of the faces of the light transmitting stamper 28 is a transfer face 28A for transferring the convexo-concave pattern composed of pits or grooves of the second information layer 18. On the transfer face 28A, such a convexo-concave pattern that a width of a concave portion is limited to be 53% or more and 72% or less with respect to the track pitch (radial pitch of concavity and convexity) is formed. Since a width of the convex portion on the transfer face 28A is 28% or more with respect to the track pitch, the convexo-concave pattern on the transfer face 28A is hardly deformed, damaged or the like. Moreover, the light transmitting stamper 28 has a through hole 28B in the vicinity of the center. The through hole 28B has an inner diameter allowing the core member 22 to be fitted therein with play.

Figure 7:
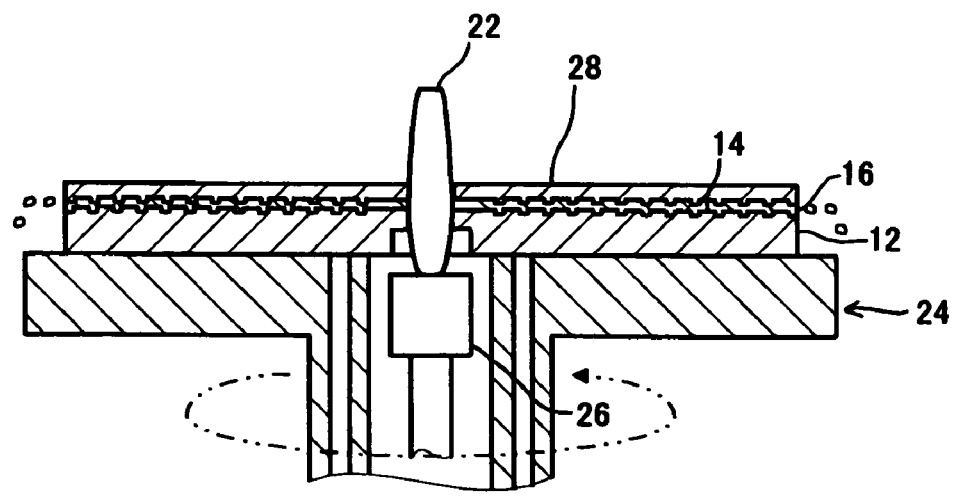
FIG. 7 is a sectional side view schematically showing a step of forming a spacer layer with the light transmitting stamper.

The light transmitting stamper 28 is abutted on the applied energy beam curable resin and then is pressurized as shown in FIG. 7 so as to be brought closer to the substrate 12 at a distance of approximately 25 µm therefrom. Then, the energy beam curable resin gets into the concave portions on the first information layer 14 and on the transfer face 28A of the light transmitting stamper 28. As a result, the convexo-concave patterns of pits or grooves are transferred to both the surfaces of the energy beam curable resin to form the energy beam curable resin in a shape of the spacer layer 16 (S106). Such a convexo-concave pattern that the width of the convex portion is limited to be 53% or more and 72% or less with respect to the track pitch (pitch of convex and concave portions) is transferred to the face of the spacer layer 16, which is opposite to the substrate 12 side.

Figure 8:
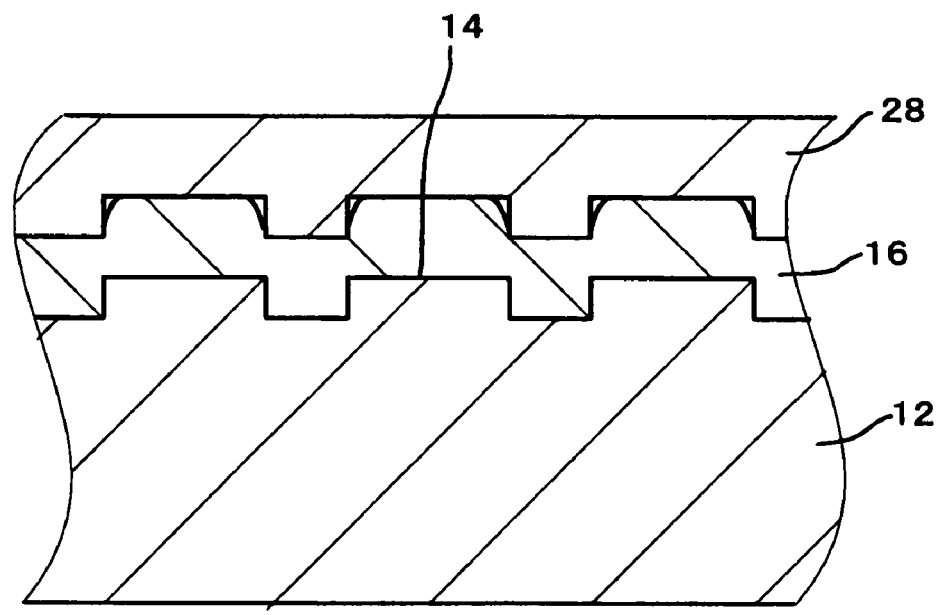
FIG. 8 is a sectional side view schematically showing a profile of convexo-concave patterns of the spacer layer in an enlarged manner.

At this time, the energy beam curable resin is in a flowing state. On the other hand, as illustrated in FIG. 8 in an enlarged manner, the energy beam curable resin cannot get into the corners of the concave portions of the transfer face 28A of the light transmitting stamper because of its viscosity. As a result, the periphery of each of the convex portions of the convexo-concave pattern of the spacer layer 16 is sometimes formed in a slightly rounded shape. However, since the width of the convex portion is sufficiently large to be 53% or more with respect to the track pitch (pitch of concavity and convexity), a proportion of the flat part at the tip to the width is large even if the periphery is rounded, resulting in a small difference from a desired convex shape. Specifically, the convexo-concave pattern of the spacer layer 16 has favorable profile accuracy.

Alternatively, the spacer layer 16 having a thickness of approximately 25 µm may be formed in the following manner. After the light transmitting stamper 28 is abutted on the energy beam curable resin, the rotating table 24 is rotated so as to allow the energy beam curable resin to flow outward in a radial direction by centrifugal force. A part of the flowing energy beam curable resin is released outward in the radial direction from the space between the substrate 12 and the light transmitting stamper 28. The light transmitting stamper 28 is brought close to the substrate 12 by a negative pressure so as to transfer the convexo-concave pattern to both the surfaces of the energy beam curable resin and to set a thickness to approximately 25 µm. Alternatively, pressing and rotation may be used at the same time so that the convexo-concave patterns are transferred to both the surfaces of the energy beam curable resin while achieving a thickness of approximately 25 µm.

Figure 9:
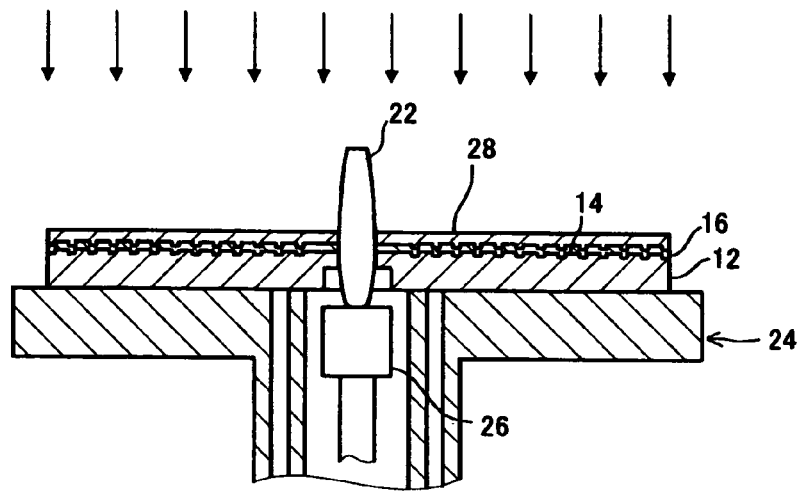
FIG. 9 is a sectional side view schematically showing a curing step of the spacer layer.

Next, as shown in FIG. 9, the spacer layer 16 is uniformly irradiated with an energy beam such as an ultraviolet ray through the light transmitting stamper 28 so as to be cured (S108).

Figure 10:
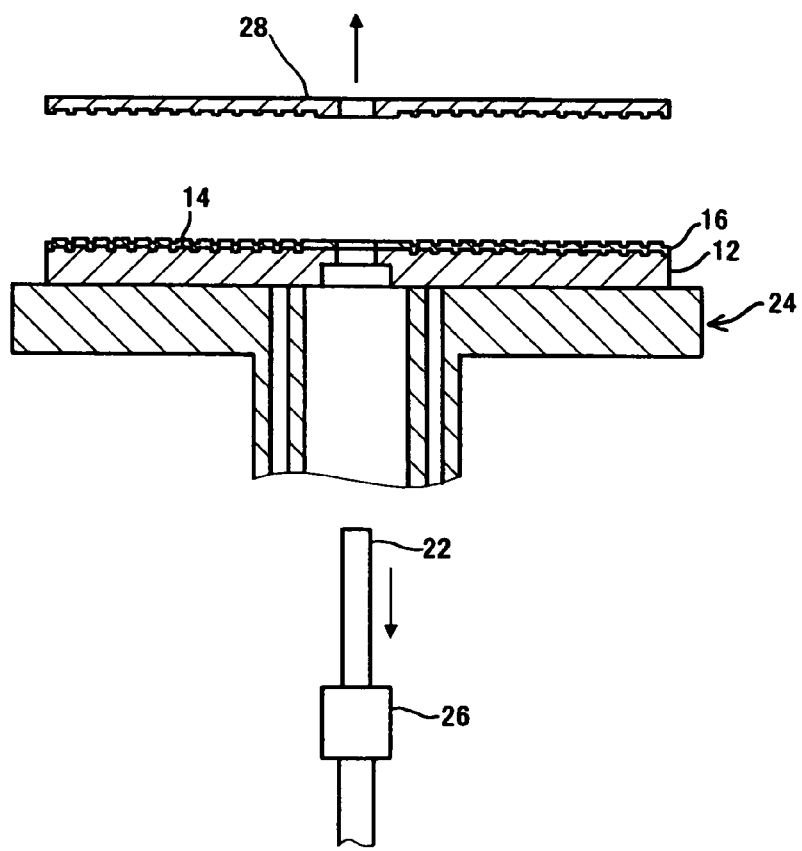
FIG. 10 is a sectional side view showing a state where the light transmitting stamper and the core member are removed from the spacer layer.

At this step, as shown in FIG. 10, the light transmitting stamper 28 is removed from the spacer layer 16. Then, the interior of the core member 22 is depressurized to be restored to a normal state from an expanded state so that the core member 22 is separated away from the substrate 12. Since the core member 22 is made of a silicone resin, a fluorocarbon resin, or the like, it hardly sticks to the spacer layer 16. Accordingly, the substrate 12 can be easily separated away from the core member 22.

Furthermore, after the substrate 12, on which the spacer layer 16 is formed, is removed from the rotating table 24, the second information layer 18 is formed on the spacer layer 16 by sputtering, vapor deposition or the like (S110). The second information layer 18 is formed to have a convexo-concave patterned shape in accordance with the convexo-concave pattern of the spacer layer 16 (on the side opposite to the substrate 12). Since the convexo-concave pattern of the spacer layer 16 has good profile accuracy, the convexo-concave pattern of the second information layer 18 also has good profile accuracy.

Figure 11:
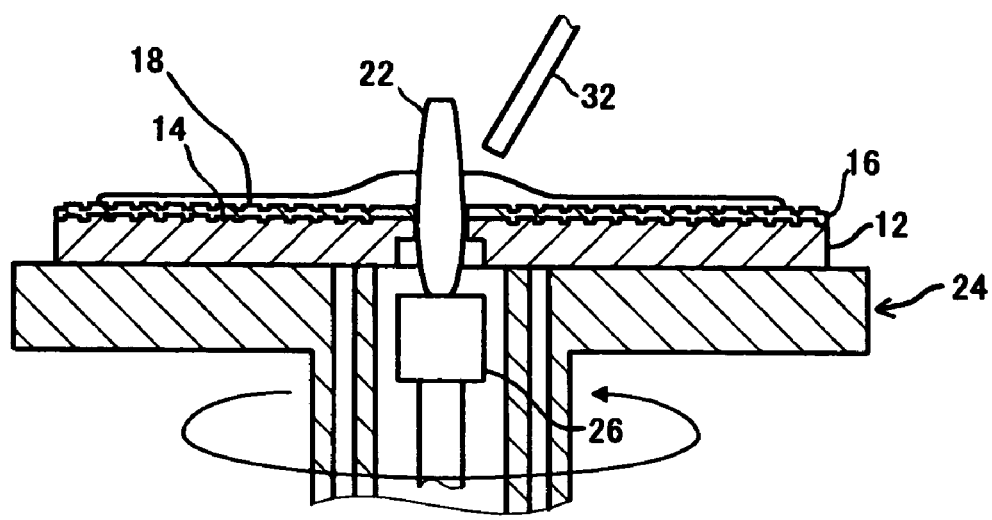
FIG. 11 is a sectional side view schematically showing a process of extending a light transmitting layer over the spacer layer.

Next, the substrate 11 is held on the rotating table 24 again. After the core member 22 is brought in close contact with the inner circumference of the manufacture hole 12B, a nozzle 32 is brought close to the vicinity of the core member 22 while the rotating table 24 is being driven to rotate as shown in FIG. 11. Then, when a predetermined amount of the energy beam curable resin in a flowing state is fed on the second information layer 18 from the nozzle 32, the supplied energy beam curable resin is extended outward in a radial direction by centrifugal force. At this time, since the centrifugal force acting on the resin is smaller in the vicinity of the core member 22 having a smaller outer diameter than the center hole 10a than that on the outer circumferential side, the resin is reserved in the vicinity of the core member 22 and its flow on the spacer layer 16 is stabilized. Moreover, since the resin adhered to the core member 22 tends to remain in the vicinity of the core member 22 due to its viscosity. Also in this regard, the effects of stabilizing the flow of the resin on the spacer 16 are enhanced.

Figure 12:
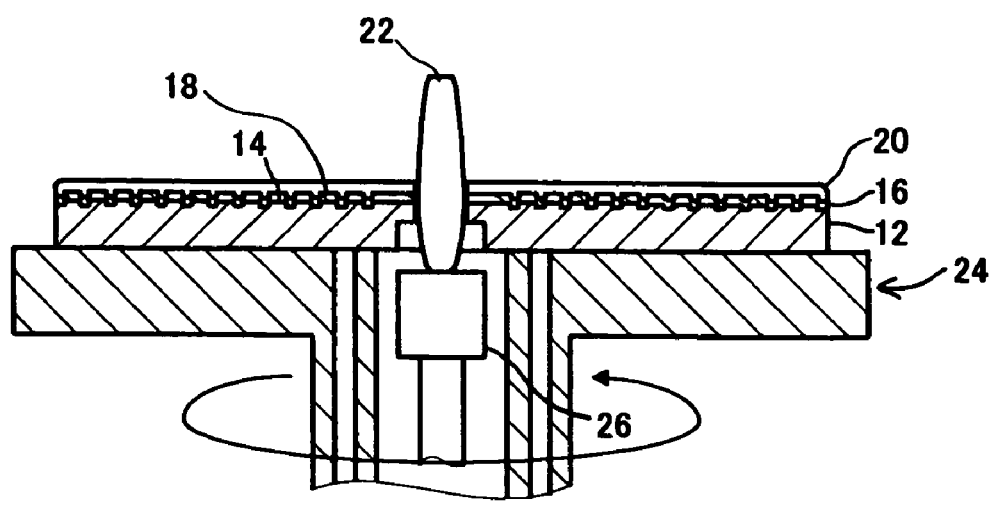
FIG. 12 is a sectional side view schematically showing a state where the light transmitting layer is extended to have a predetermined thickness.

As a result, as shown in FIG. 12, the light transmitting layer 20 is extended over the entire surface of the spacer layer 16 to have a uniform thickness of approximately 75 µm (S112).

Figure 13:
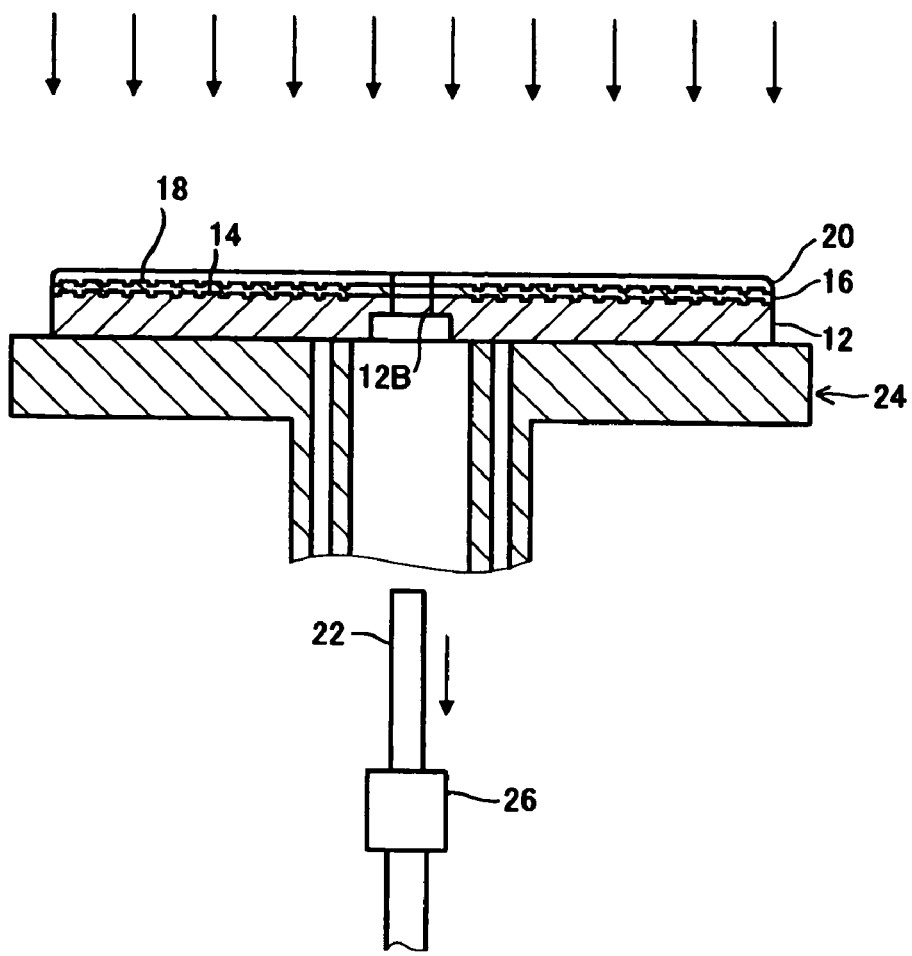
FIG. 13 is a sectional side view schematically showing a curing step of the light transmitting layer.

Subsequently, as shown in FIG. 13, the rotation of the rotating table 24 is stopped. The extended light transmitting layer 20 is uniformly irradiated with an energy beam such as an ultraviolet ray so as to be cured (S114).

Next, the interior of the core member 22 is depressurized to be restored to a normal state from an expanded state so that the core member 22 is separated away from the substrate 12.

Figure 14:
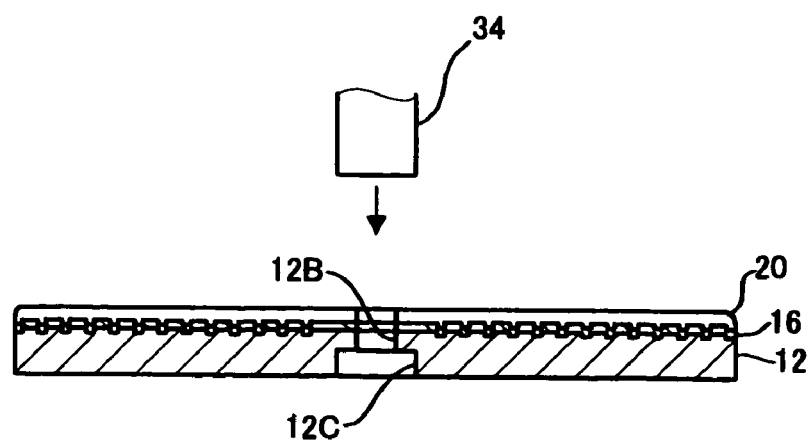
FIG. 14 is a sectional side view schematically showing a step of forming the center hole.

After the substrate 12 is removed from the rotating table 24, a jig is fitted into the manufacture hole 12B so as to position the substrate 12 (the illustration herein omitted). Thereafter, as shown in FIG. 14, a circular tool 34, which has an outer diameter equal to the inner diameter of the center hole 10A, is coaxially arranged on the substrate 12 so as to abut on and perforate through the substrate 12 in an axial direction to form the center hole 10A through the substrate 12 (S116). The circular concave portion 12C having the same inner diameter as that of the center hole 10A, which is formed in the substrate 12, facilitates the perforation. Moreover, by positioning the substrate 12 with use of the manufacture hole 12B, the amount of eccentricity of the center hole 10A can be kept small.

By the above process, the optical recording medium 10 is completed.

Although the ultraviolet curable acrylic resin and the ultraviolet curable epoxy resin are exemplified as examples of the material of the spacer layer 16 and the light transmitting layer 20 in this exemplary embodiment, other energy beam curable resin materials having light transmittance such as an electron beam curable resin can also be used.

In this exemplary embodiment, the core member 22 is made of a silicone resin, a fluorocarbon resin, or the like to have elasticity. The core member 22 also has a round-bar shape with an outer diameter slightly smaller than the inner diameter of the manufacture hole 12B in its normal state so as to be fitted into the manufacture hole 12B with play. However, a material and a shape of the core member 22 are not particularly limited as long as the core member 22 has such a structure that it can come into close contact with the inner circumference of the manufacture hole 12B. In place of the core member 22, a cap-like member may be used to close the manufacture hole 12B formed through the substrate 12 so as to prevent the energy beam curable resin from entering the manufacture hole 12B.

Although the optical recording medium 10 has a disc-like shape with the center hole 10A in this exemplary embodiment, the present invention is also applicable to the manufacture of a multilayer recording type optical recording medium without any center hole.

Although the optical recording medium 10 is dual-layer recording type including a space layer and two information layers, that is, the first information layer 14 and the second information layer 18, in this exemplary embodiment, the present invention is also applicable to a multilayer recording type optical recording medium including two or more spacer layers and three or more information layers.

The optical recording medium 10 is described as a single-sided multilayer recording type medium capable of recording information only on one side in this exemplary embodiment. However, it is apparent that the present invention is also applicable to a double-sided multilayer recording type optical recording medium capable of recording information on both sides. For example, in the case of double-sided dual-layer recording type, a thickness of a substrate is set to approximately 1.0 mm. A spacer layer having a thickness of 25 μm and a light transmitting layer having a thickness of 75 μm are formed on each of the surfaces of the substrate, whereby an optical recording medium having a thickness of 1.2 mm can be obtained.

The convexo-concave patterns of the first information layer 14 and the second information layer 18 may be equal to each other or different from each other in accordance with the type of optical recording medium.

WORKING EXAMPLE

Three types of optical recording mediums 10, each including the second information layer 18 in a different shape, were manufactured. For each type, ten optical recording mediums 10 were manufactured. Namely, thirty optical recording mediums 10 were manufactured in total. Specifically, the convexo-concave pattern of the second information layer 18 was such a spiral groove shape that a track pitch was approximately 320 nm and a height was approximately 20 nm. Three types of optical recording mediums 10 had different groove widths, i.e., approximately 170 nm (corresponding to approximately 53% of the track pitch), approximately 200 nm (corresponding to approximately 62% of the track pitch), and approximately 230 nm (corresponding to approximately 72% of the track pitch), respectively.

Figure 16:
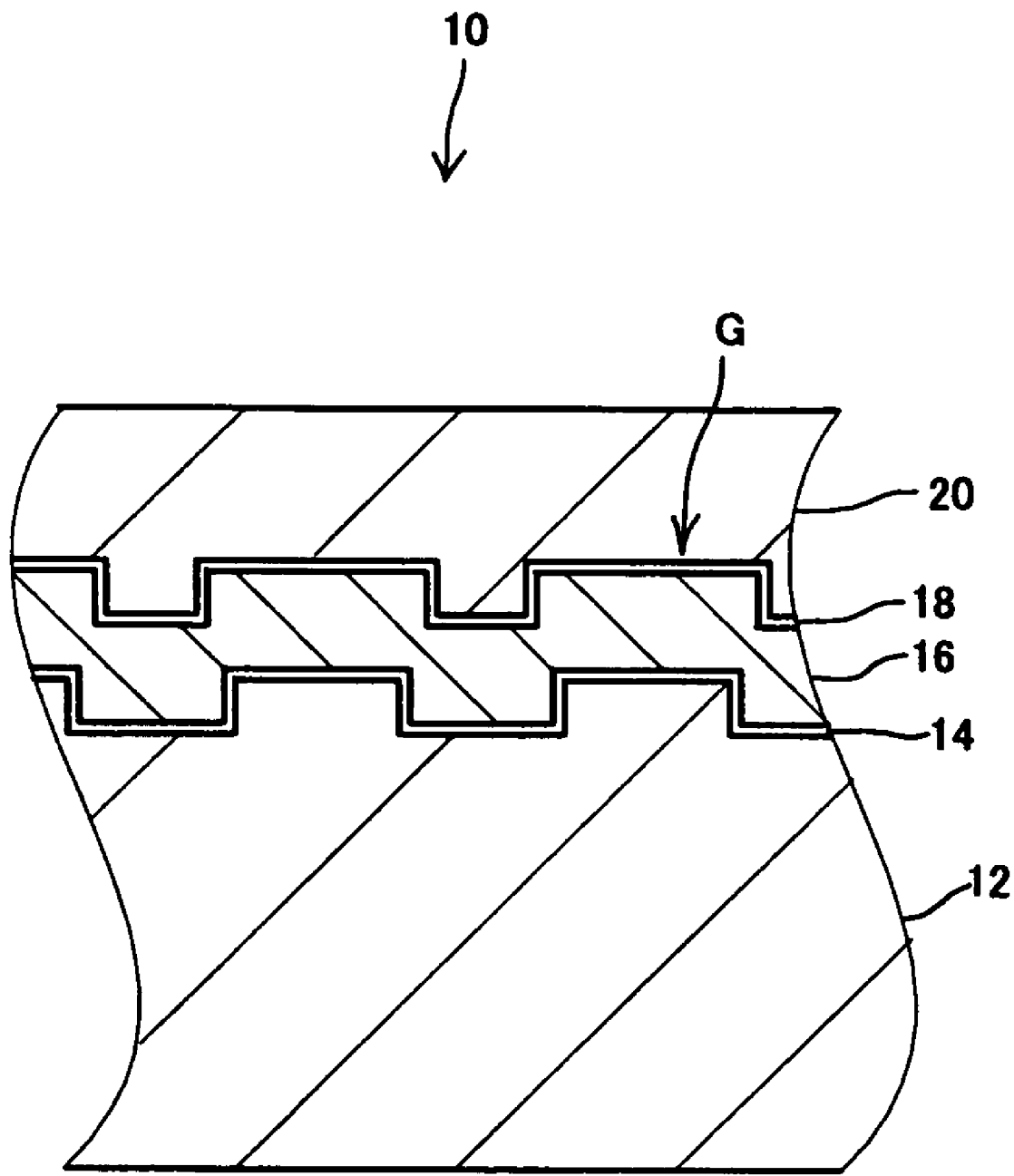
FIG. 16 is a sectional side view schematically showing the shapes of information layers of the optical recording medium according to Working Example of the present invention in an enlarged manner.

The groove in this working example designates a convex portion projecting toward the light transmitting layer 20 side as designated with the reference symbol G in FIG. 16.

The convexo-concave pattern of the first information layer 14 was also such a spiral groove shape that a track pitch was approximately 320 nm and a height was approximately 20 nm. A groove width was set to approximately 160 nm (corresponding to approximately 50% of the track pitch) (the groove width was common to three types of optical recording mediums 10).

As the energy beam curable resin, which was a material of the spacer layer 14, the following materials were used. Pentaerythritol triacrylate: approximately 50 parts by weight Hydroxypivalic acid neopentyl glycol diacrylate: approximately 50 parts by weight 1-hydroxy cyclohexyl phenyl ketone: approximately 3 parts by weight.

A jitter of the second information layer 18 was measured for each of the optical recording mediums 10. Then, an average value of ten optical recording mediums 10 having the same groove width was calculated. As a result, as shown in Table 1, the average values were 7.73% in the case where the groove width was 170 nm, 7.21% in the case where the groove width was 200 nm, and 7.25% in the case where the groove width was 230 nm.

A jitter of the first information layer 14 of each of the optical recording mediums 10 was also measured. Then, an average value of ten optical recording mediums 10 of the same type was calculated to be 7.42% as shown in Table 1.

A noise (dBm) of the second information layer 18 at a plurality of frequencies (MHz) was measured for each of the optical recording mediums 10. An average value of ten optical recording mediums 10 having the same groove width was calculated as shown in Table 2 and FIG. 15. A curve denoted by the reference symbol A in FIG. 15 designates the case where the groove width was 230 nm, a curve denoted by the reference symbol B designates the case where the groove width was 200 nm, and a curve denoted by the reference symbol C designates the case where the groove width was 170 nm. A noise (dBm) of the first information layer 14 at a plurality of frequencies (MHz) was also measured for each of the optical recording mediums 10. The results were as shown in table 2 and a curve denoted by the reference symbol D in FIG. 15.

For measurement of the jitters and the noises, an optical disc evaluation device DDU1000 (manufactured by Pulstec Industrial Co., Ltd.) was used.

COMPARATIVE EXAMPLE

In contrast with the above-described Working Example, two types of optical recording mediums 10 having different groove widths of the convexo-concave pattern of the second information layer 18 were manufactured. For each type, ten optical recording mediums 10 were manufactured; namely, twenty optical recording mediums were manufactured in total. Specifically, two types of optical recording mediums 10 were manufactured to have approximately 150 nm (corresponding to approximately 47% of the track pitch) and approximately 160 nm (corresponding to approximately 50% of the track pitch) as a groove width of the convexo-concave pattern of the second information layer 18, respectively. The other conditions were the same as those in the above Working Example.

A jitter of the second information layer 18 was measured for each of the optical recording mediums 10. Then, an average value of ten optical recording mediums 10 having the same groove width was calculated. As a result, the jitters were 10.3% in the case where the groove width was 150 nm and 8.84% in the case where the groove width was 160 nm.

A noise (dBm) of the second information layer 18 at a plurality of frequencies (MHz) was measured for each of the optical recording mediums 10. Then, an average value of ten optical recording mediums 10 having the same groove width was calculated as shown in Table 2 and FIG. 15. A curve denoted by the reference symbol E in FIG. 15 designates the case where the groove width was 160 nm, and a curve denoted by the reference symbol F designates the case where the groove width was 150 nm.

TABLE 1

|  | Working Example | | | | Comparative example Second information layer | |
|---|---|---|---|---|---|---|
|  | Second information layer | | | First information layer | | |
| Groove width (nm) | 230 | 200 | 170 | 160 | 160 | 150 |
| Proportion of groove width to track pitch (%) | 72 | 62 | 53 | 50 | 50 | 47 |
| Jitter value (%) | 7.25 | 7.21 | 7.73 | 7.42 | 8.84 | 10.30 |

TABLE 2

|  |  | Working Example | | | | Comparative example Second information layer | |
|---|---|---|---|---|---|---|---|
|  |  | Second information layer | | | First information layer | | |
| Groove width (nm) | | 230 | 200 | 170 | 160 | 160 | 150 |
| Proportion of groove width to track pitch (%) | | 72 | 62 | 53 | 50 | 50 | 47 |
| Noise (dBm) | 2 (MHz) | −61.9 | −62.8 | −60.1 | −60.7 | −57.5 | −55.1 |
|  | 4 (MHz) | −63.9 | −65.1 | −61.9 | −62.3 | −59.9 | −57.1 |
|  | 8 (MHz) | −67.1 | −68.5 | −65.6 | −66.2 | −63.1 | −61.4 |
|  | 12 (MHz) | −69.8 | −70.6 | −68.7 | −69.3 | −67.3 | −65.3 |
|  | 16 (MHz) | −71.7 | −71.9 | −71.5 | −71.4 | −70.8 | −70.4 |
|  | 20 (MHz) | −72.0 | −72.1 | −72.2 | −71.7 | −71.1 | −71.5 |

As shown in Table 1, it is confirmed that the jitter of the second information layer 18 tends to decrease as the groove width increases. The jitter of the second information layer 18 exceeds the target upper limit value, i.e., 8%, in Comparative Example (the groove widths were 150 nm and 160 nm), whereas the jitter of the second information layer 18 is good to be lower than the target upper limit value of 8% in Working Example (the groove widths were 170 nm, 200 nm, and 230 nm, which correspond to 53% or more of the track pitch). n particular, in the case where the groove width is 200 nm (corresponding to approximately 62% of the track pitch) or larger, the jitter of the second information layer 18 is particularly good to be lower than the jitter of the first information layer 14.

Figure 15:
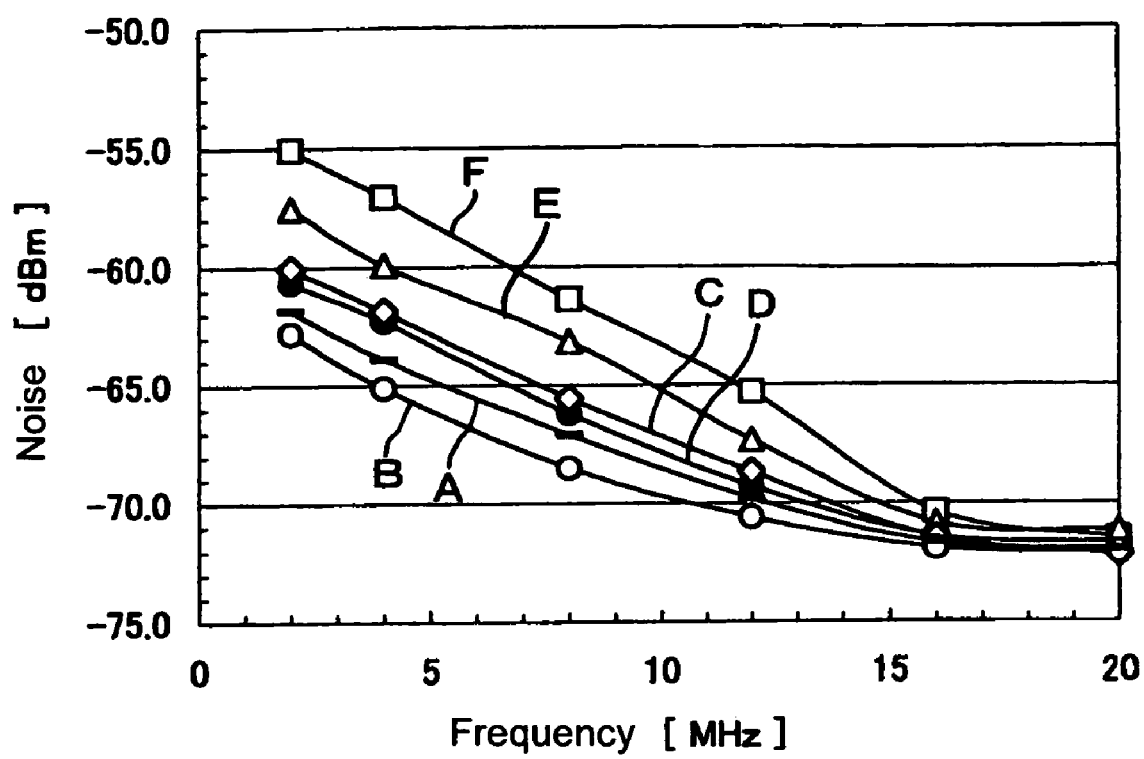
FIG. 15 is a graph showing noise values in optical recording mediums according to Working Example of the present invention and Comparative Example.

As shown in Table 2 and FIG. 15, the noise value of the second information layer 18 exceeds that of the first information layer 14 in Comparative Example, whereas the noise value of the second information layer 18 is good to be kept to the same level as or lower than the noise value of the first information layer 14 in Working Example. In particular, when the groove width is 200 nm (corresponding to approximately 62% of the track pitch) or larger, the noise value of the second information layer 18 is particularly good to be smaller than the noise value of the first information layer 14.

Specifically, it is confirmed that the groove width is set to 53% or larger with respect to the track pitch in order to obtain good electric characteristics of the second information layer 18. It is also confirmed that much better results can be obtained by setting the groove width to 62% or more of the track pitch. Moreover, in order to prevent the deformation, the damage, and the like of the convexo-concave pattern of the transfer face of the light transmitting stamper, it is preferred that the groove width be set to 72% or less with respect to the track pitch.

The various exemplary embodiments of the present invention can be used to manufacture an optical recording medium including a plurality of information layers and a spacer layer interposed therebetween.

What is claimed is:
1. An optical recording medium comprising:
a substrate;
a first information layer formed over the substrate;
a spacer layer formed on the first information layer; and a second information layer formed on the spacer layer, wherein:

a convexo-concave pattern constituting at least one of a groove and a pit is formed on a face of the spacer layer, the face being opposite to the substrate side, so that a radial width of a convex portion is limited to be 53% or larger and 72% or smaller with respect to a radial pitch of concavity and convexity; and the second information layer on the spacer layer is formed in accordance with the convexo-concave pattern.

2. The optical recording medium according to claim 1, wherein:

the convexo-concave pattern constituting at least one of the groove and the pit is formed on the face of the spacer layer, the face being opposite to the substrate side, so that the radial width of the convex portion is limited to be 62% or larger with respect to the radial pitch of the concavity and the convexity; and the second information layer on the spacer layer is formed in accordance with the convexo-concave pattern.

3. A method for manufacturing an optical recording medium, comprising the steps of:

supplying an energy beam curable resin onto a first information layer formed over a substrate;

abutting a light transmitting stamper on the energy beam curable resin so as to transfer a convexo-concave pattern including at least one of a groove and a pit thereto;

radiating an energy beam to the energy beam curable resin through the light transmitting stamper so as to cure the energy beam curable resin and removing the light transmitting stamper to form a spacer layer; and forming a second information layer on the spacer layer in accordance with the convexo-concave pattern, wherein:

the convexo-concave pattern is transferred to a face of the spacer layer, the face being opposite to the substrate side, so that a radial width of a convex portion is limited to be 53% or larger and 72% or smaller with respect to a radial pitch of concavity and convexity; and the second information layer on the spacer layer is formed in accordance with the convexo-concave pattern.

4. The method for manufacturing an optical recording medium according to claim 3, wherein:

the convexo-concave pattern is transferred to the face of the spacer layer, the face being opposite to the substrate side, so that the radial width of the convex portion is limited to be 62% or larger with respect to the radial pitch of the concavity and the convexity; and the second information layer on the spacer layer is formed in accordance with the convexo-concave pattern.

* * * * *